United States Patent [19]
Tanaka et al.

[15] 3,673,283
[45] June 27, 1972

[54] VINYL CHLORIDE POLYMER BLENDED WITH A NITRILE-METHACRYLATE-ACRYLATE TERPOLYMER

[72] Inventors: Akira Tanaka, Yokohama; Tsuyoshi Hattori, Tokyo; Hirotomo Anno; Testuyo Kawahara, both of Kamakura, all of Japan

[73] Assignee: The Japanese Geon Company, Ltd., Tokyo, Japan

[22] Filed: March 23, 1970

[21] Appl. No.: 21,927

[52] U.S. Cl. .................... 260/898, 260/29.6 RB, 260/881
[51] Int. Cl. ............................................. C08f 37/18
[58] Field of Search .................................... 260/898

[56] References Cited

UNITED STATES PATENTS

| | | |
|---|---|---|
| 3,520,953 | 7/1970 | Sugimoto et al. ............. 260/890 |
| 2,956,041 | 10/1960 | Reid et al. ..................... 260/898 |
| 2,679,792 | 11/1956 | Ham ............................... 260/32.6 |

Primary Examiner—Murray Tillman
Assistant Examiner—J. Seibert
Attorney—Sherman and Shalloway

[57] ABSTRACT

A vinyl chloride polymer composition excelling in processability, transparency and other properties, such composition comprising (I) at least one vinyl chloride polymer selected from the group consisting of vinyl chloride homopolymers and vinyl chloride copolymers, vinyl chloride content of which is at least 70 percent by weight and (II) a copolymer consisting of 2 – 30 percent by weight of an unsaturated nitrile, 10 – 98 percent by weight of methyl methacrylate and 0 – 60 percent by weight of an alkyl acrylate.

4 Claims, 4 Drawing Figures

VINYL CHLORIDE POLYMER BLENDED WITH A NITRILE-METHACRYLATE-ACRYLATE TERPOLYMER

This invention relates to thermoplastic polymer compositions which excel in processability, transparency and other physical and chemical properties. More specifically, this invention relates to vinyl chloride polymer compositions consisting predominantly of (I) at least one vinyl chloride polymer selected from the group consisting of vinyl chloride homopolymers and copolymers and (II) an unsaturated nitrile-methyl methacrylate-alkyl acrylate copolymers.

While vinyl chloride homopolymers and copolymers (herein generically referred to as PVC) have good chemical and physical properties and are widely used, they have the shortcoming of being poor in their processability in various respects. That is to say, their melt viscosity is high (poor fluidity); their temperature dependency is great; they are difficult to render promptly into a homogeneous melt from their powdered from by such kneading operations as by means of rolls, etc.; the surface condition of the melt-shaped articles obtained therefrom are poor; etc. While a part of these defects can be solved by the addition of a plasticizer, this does not provide an overall solution in the case the rigid products, since there are problems in connection with the mechanical strength of the products and the extraction and volatility of the plasticizer. There have been suggested a number of methods of improving the processability of PVC by the addition of resinous materials which do not bring about the softening effect as in the case of the plasticizers, but all have serious shortcomings. For example, in the case of the method of adding a copolymer of methyl methacrylate and styrene (U.S. Pat. No. 2,791,600), while the effect of lowering the melt viscosity is noted, the mechanical strength of the product suffers and, in addition, practically no effect of improving the surface condition of the molded product can be seen. Exactly the same applies in the case of the method of adding a copolymer of styrene and an alkyl acrylate (Japanese Pat. specification Publication No. 37/13864).

On the other hand, while an improvement in the surface condition of the extruded and injection molded products is seen in the case of the method of adding a copolymer of an alkyl acrylate and methyl methacrylate or a homopolymer of methyl methacrylate (U.S. Pat. No. 3,373,229), there is the fatal drawback that the melt viscosity rather than being lowered becomes higher, as well as the transparency of the PVC is impaired. On the other hand, the method of adding a copolymer of acrylonitrile and styrene (Japanese Pat. specification Publication No. 29/5246) has the same shortcoming as that of U.S. Pat. No. 3,373,229.

It is therefore the object of the present invention to provide PVC compositions which excel in processability, transparency and other properties.

With a view to achieving the foregoing object, research was conducted into the processability of the compositions of PVC with various copolymers and, as a result, the hereinbefore described drawbacks were solved completely and PVC compositions which, in addition, possessed new advantages were discovered. Namely, it was found that the ternary copolymer of methyl methacrylate, an alkyl acrylate and an unsaturated nitrile of specified composition or a binary copolymer of methyl methacrylate and an unsaturated nitrile of specified composition was perfectly compatible with PVC and provided compositions which were perfectly transparent. Moreover, the PVC compositions obtained, due in all likelihood to the perfect compatibility, were far superior to the conventional compositions as to the surface condition of their molded products and their fluidity, transparency and mechanical properties extending over the entire range of their processing temperatures. It was further found that these compositions possessed such new advantages in that since there was a marked improvement of the compositions' fluidity at low temperatures, the processing temperature could be lowered and an improvement could be had in the thermal stability of the compositions during their processing. In addition, it was found that an improvement in processability could be expected in the case of their addition to the plastisized PVC as in the case of rigid PVC, and also that an improvement was noted in the deflection temperature under load when a copolymer, the content of the alkyl acrylate of which was low was used.

The present invention was thus perfected on the basis of the foregoing knowledge. According to this invention, as hereinafter fully described, vinyl chloride polymer compositions are provided which are composed of (I) at least one vinyl chloride polymer selected from the group consisting of vinyl chloride homopolymers and copolymers and (II) a copolymer of (a) 2 – 30 percent by weight of an unsaturated nitrile, (b) 10 – 98 percent by weight of methyl methacrylate and (c) 0 – 60 percent by weight of an alkyl acrylate.

Referring to the accompanying drawings: FIG. 1 is a triangular diagram showing the composition of the copolymer (II) of the invention composition;

Figure 1:
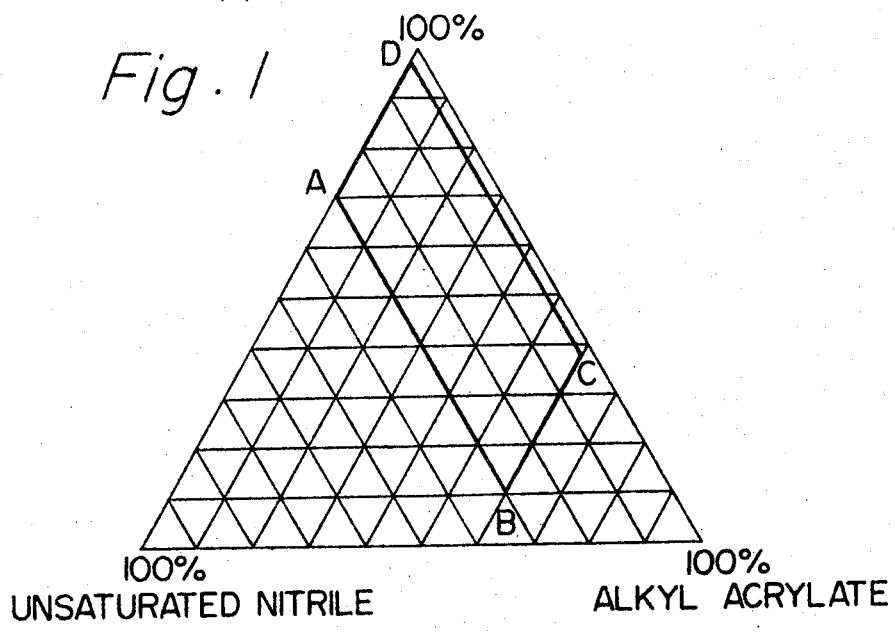

As the alkyl acrylates (c), one of the components of the copolymer (II) which make up the invention composition along with PVC (I), chosen are alkyl acrylates whose alkyl radical contains one to 10 carbon atoms, i.e. methyl acrylate, ethyl acrylate, n-butyl acrylate and 2-ethylhexyl acrylate, which may be used singly or in combination as a mixture. Preferred are the alkyl acrylates whose alkyl radical contains two to eight carbon atoms.

As the unsaturated nitriles (a), one of the other components of the copolymer (II), usually used is acrylonitrile, but the alpha, beta-unsaturated nitriles such as methacrylonitrile, ethacrylonitrile, chloroacrylonitrile and alpha-cyanoethylacrylonitrile can also be used singly or in combination.

The composition obtained by mixing in PVC a copolymer whose content of unsaturated nitriles is less than 2 percent by weight exhibits no great difference in either its transparency or fluidity as compared with the conventional product. On the other hand, in the case of the composition obtained by mixing in PVC a copolymer whose content of unsaturated nitriles exceeds 30 percent by weight, there appears the defect of coloration of products. Further, since the compatibility with PVC is poor in this case, only small improvement is had in the surface condition of the product and, in addition, its fluidity becomes poor. The optimum amount to be used of the unsaturated nitriles depends upon the chain length of the alkyl radical of the alkyl acrylate, the other component of copolymer (II). In the case the alkyl radical is methyl, it is preferably used in an amount of 3 – 5 percent by weight, while in the case of ethyl, it is used in an amount of ca. 10 percent by weight, and in the case of 2-ethylhexyl, about 15 to 25 percent by weight. There is not much relationship between this amount and the weight ratio of methyl methacrylate to alkyl acrylate.

In the copolymer (II) the content of alkyl acrylates is 0 to 60 percent by weight, while the content of methyl methacrylate is 10 to 98 percent by weight. A copolymer (II) containing no alkyl acrylates at all, i.e., one composed of an unsaturated nitrile and methyl methacrylate is also useful for improving the processability and transparency of PVC when mixed therewith. Generally speaking, in the case of a copolymer (II) whose content of alkyl acrylates is low, there is a tendency that its dispersion is somewhat poor when it is kneaded with PVC. This tendency becomes somewhat greater in the case of a plastisized compound which has been also incorporated with a liquid plasticizer. In the case of a plastisized compound such as this it is preferred to use a copolymer (II) whose content of alkyl acrylate is at least 10 percent by weight. As the proportion of alkyl acrylate to methyl methacrylate becomes great in the copolymer (II), the effect of improving the fluidity of the PVC composition becomes greater. A copolymer whose content of alkyl acrylate exceeds 60 percent by weight demonstrates rubbery properties and loses its property of improving the surface condition of the PVC product. However, a copolymer of a composition such as this makes a marked improvement in the fluidity of PVC, has properties making it useful as a high molecular weight plasticizer, and excels in respect of its coloration prevention of PVC products as compared with the heretofore-known butadiene-acrylonitrile copolymer. The most generally desirable ratio of alkyl acrylate to methyl methacrylate, on a weight basis, is a range from 1:9 to 2:1.

The copolymer (II) may also be one which has been obtained by copolymerizing the aforesaid monomers (a), (b) and (c) along with an aliphatic vinyl such as vinyl acetate and vinyl propionate, a vinyl ether such as vinylbutyl ether, or other monomers which are copolymerizable with said monomers (a), (b) and (c). It is provided however that for achieving the object of the present invention the amount used of this fourth monomer must not exceed 10 percent by weight of the total amount used of the monomers (a), (b) and (c).

While the copolymer (II) can be made by any suitable method, preferred is a procedure in which it is finally obtained as fine particles. A copolymer (II) of fine particulate form is an advantage since it can be easily managed in blending and kneading it with the PVC which is usually fed in a powdery particulate state. Further, in the case of a PVC composition which has been incorporated with a copolymer (II) whose particles are too large, at times the dispersion of the particles become incomplete in the case where the molding is by means of the powder extrusion or powder injection techniques. Hence, while it is possible to prepare the copolymer (II) by means of either the bulk, solution or suspension polymerization method, that usually preferred is the emulsion polymerization method, followed either by drying the resulting latex to fine particles with a spray dryer or by solidifying and drying the latex by the addition of salts.

Useable as the emulsifier for carrying out the emulsion polymerization are the known emulsifiers such as the fatty acid soaps as sodium oleate as well as sodium alkylbenzene sulfonate, sodium alkylnaphthalene sulfonate and sodium n-octadecyl-N-1,2-dicarboxyethylsulfosuccinamate. On the other hand, as the polymerization initiator, useable are the peroxides such as potassium peroxide or the various oxidation-reduction catalysts. The known conditions can be employed for the polymerization temperature and the other polymerization conditions.

Since it is desirable that the copolymer (II) is one of maximum homogeniety for achieving the object of the present invention, there may be occasions where it is necessary to defer the addition to the polymerization system of a part of the monomer whose reaction is rapid. However, since the monomers making up copolymer (II) generally react at about the same speed, there is hardly any necessity for such deferment in adding the monomers.

Further, the copolymer (II) must be one whose intrinsic viscosity is above a certain level. The higher the average degree of polymerization of the PVC, the higher must be the intrinsic viscosity of the copolymer. For a PVC of an average degree of polymerization of about 600 a copolymer (II) having an intrinsic viscosity (25° C., chloroform) of above 0.4 – 0.5 and for a PVC of an average degree of polymerization of about 1,000 a copolymer (II) having an intrinsic viscosity of above 2 are preferred. The degree of polymerization of copolymer (II) can be satisfactorily adjusted by the known methods, say, a method of adjusting the amount added of alkyl mercaptan.

The method of mixing the PVC with the copolymer (II) may be carried out by any of the following procedures: namely, mixing the two which are both in the form of powder, adding a latex of copolymer (II) to the PVC powder followed by drying, adding a latex of copolymer (II) to a suspension or emulsion of the PVC particles followed by drying, or copolymerizing the monomeric mixture which make up the copolymer (II), in a PVC slurry and then drying the resulting polymer composition.

The proportion in which the copolymer (II) is mixed can be varied within the range of 0.2 to 100 parts by weight per 100 parts by weight of the PVC to suit the purpose for which the composition is intended. For the purpose of improving the surface condition of the molded product, 0.2 to 5 parts by weight are suitable. On the other hand, for improving the deflection temperature under load, 10 to 100 parts by weight, for improving the fluidity, 1 to 30 parts weight, and when it is intended to be used as a high molecular weight plasticizer, at least 10 parts by weight are preferred.

Fillers, pigments, stabilizer for stabilizing against heat and light, antioxidants, lubricants, antistatic agents, impact resistance improvers and blowing agents, etc., can be incorporated in the invention compositions and, in addition, plasticizer in an optional amount may also be added, if necessary.

The advantages of the invention compositions which are made by mixing a copolymer (II) in PVC (I), as previously noted, reside in their superior fluidity and transparency as well as their remarkable effect of improvement of the surface condition of products obtained therefrom. More specifically, the invention PVC compositions, when injection molded, are effective in preventing the appearance of clouds or streaks in the surface of the molded product or preventing the delamination of the surface layer as is ascertained by the acetone immersion test. In the case of extrusion molding, they are likewise effective in preventing the appearance of fine wrinkles and streaks in the surface of the molded product. This improvement in the surface condition or state of stress similarly has a favorable effect on improving the strength of the molded product. Also, in the case of vacuum molding, the molding is facilitates, since the elongation of the invention PVC compositions at elevated temperatures is great. This advantage is likewise noted when the invention PVC compositions are incorporated with a plasticizer.

The following examples are given for further illustration of the invention, it being understood that these examples are not to be construed as limiting the scope of the present invention. The parts are on a weight basis.

EXAMPLE 1

An autoclave was charged with 200 parts of distilled water, 2.5 parts of sodium dodecylbenzenesulfonate, 0.3 part of potassium persulfate, and the monomers and the molecular weight adjusting agent indicated in Table 1, after which the autoclave was purged with nitrogen and heated at 50° C. The time required for completion of the polymerization reaction was up to 8 hours. The resulting latex was solidified by pouring it into aqueous aluminum sulfate solution followed by washing and drying. Thus, the copolymer samples A, B and C were obtained. Samples D, E and F are control samples.

TABLE 1.—MONOMERIC COMPOSITIONS OF THE COPOLYMERS (PART)

| Monomer incorporated | Invention samples | | | Control samples | | |
|---|---|---|---|---|---|---|
| | A | B | C | D | E | F |
| Methyl methacrylate | 90 | 45 | 40 | 0 | 100 | 90 |
| Acrylonitrile | 10 | 10 | 20 | 10 | | |
| Ethyl acrylate | | 45 | | 90 | | 10 |
| 2-ethylhexyl acrylate | | | 40 | | | |
| tert.Dodecyl mercaptan | 0.1 | 0.1 | 0.1 | 0.1 | 0.1 | 0.1 |

The copolymer samples obtained were kneaded with polymeric vinyl chloride having an average degree of polymerization of 800 for 5 minutes on 150° C. rolls in the proportions indicated in Table 2, following which they were tested with the results shown in said Table 2.

TABLE 2

| Blend Number | Invention Samples | | | | Control Samples | | | | |
|---|---|---|---|---|---|---|---|---|---|
| | 1 | 2 | 3 | 4 | 5 | 6 | 7 | 8 | 9 |
| PVC (Geon 103EP8) | 100 | 100 | 100 | 100 | 100 | 100 | 100 | 100 | 100 |
| Dibutyl tin malate (Nitto Kasei Co. N2000E) | 3 | 3 | 3 | 3 | 3 | 3 | 3 | 3 | 3 |
| Calcium stearate | 0.5 | 0.5 | 0.5 | 0.5 | 0.5 | 0.5 | 0.5 | 0.5 | 0.5 |
| Copolymer sample | B | B | A | C | | D | E | F | F |
| Parts of copolymer | 5 | 30 | 5 | 5 | 0 | 5 | 5 | 5 | 30 |
| Light transmittance | 91 | 89 | 90 | 89 | 91 | 70 | 72 | 83 | 72 |
| Melt index ($\times 10^4$ poise) | 4.5 | 7.2 | 9.2 | 3.8 | 10 | 3.0 | 13 | 12 | 20 |
| Surface condition of extruded product: | | | | | | | | | |
| 150 (kg./cm.²) | (1) | (1) | (1) | (1) | (2) | Fair | (1) | (1) | (1) |
| 200 (kg./cm.²) | (1) | (1) | (1) | (1) | (2) | Fair | (1) | (1) | (1) |
| 250 (kg./cm.²) | (1) | (1) | (1) | (1) | (2) | (2) | (3) | (1) | (3) |
| 300 (kg./cm.²) | (1) | (1) | (1) | (1) | (2) | (2) | Fair | (3) | (3) |

¹ Excellent.
² Unsatisfactory.
³ Good.

The "light transmittance", as here used, which is measured in accordance with JIS method K6714, is expressed in percent, 100 percent being the instance where complete transmittance of light takes place through a 1-mm-thick sheet.

The "melt viscosity" is the apparent viscosity obtained when the kneaded product of the several compositions are extruded through a nozzle 1 mm in diameter and 10 mm long, using a Koka flow tester under the conditions of 190° C. and 200 kg/cm².

The "surface condition of the extruded product" is determined in the following manner. The kneaded products of the several compositions are extruded through a nozzle 1 mm in diameter and 10 mm long using a Koka flow tester under the conditions of 190° C. and 150 – 300 kg/cm². The surface condition of the so obtained extruded products is judged with the unaided eye and assigned the ratings of excellent, good, fair and unsatisfactory. The shear stress in the processing zone of an extrusion or injection molder is said to be obtainable at 200 – 300 kg/cm². Thus, it is possible according to this method of determination to forecast with exceeding exactness the surface condition of the molded product to be obtained by means of an actual processing machine.

It can be seen from the results presented in Table 2 that the compositions according to the present invention surpass the control compositions in fluidity, light transmittance and surface condition.

Figure 2:
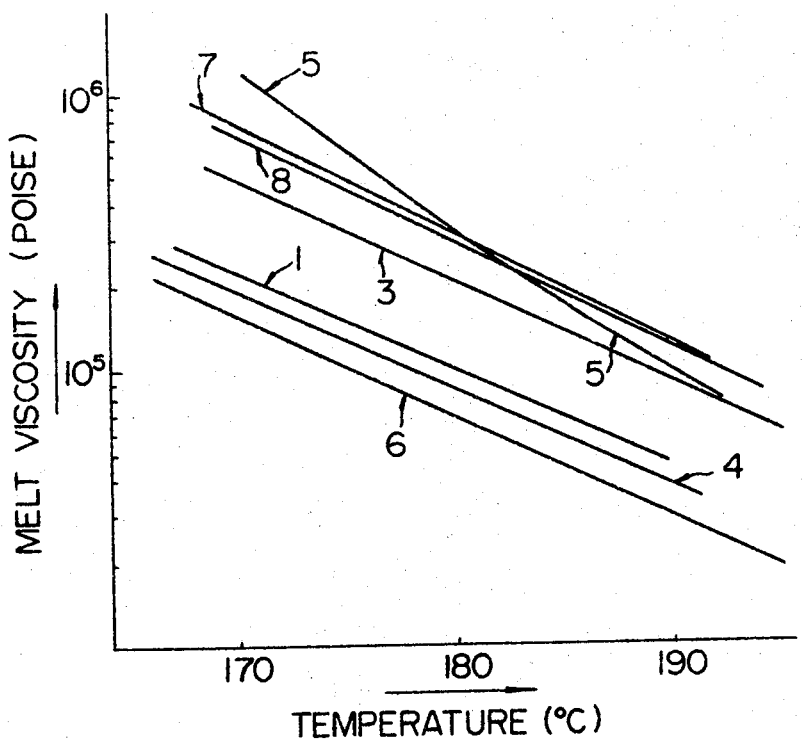
FIG. 2 is a graph representing the relationship between the temperature and melt viscosity in the case of the composition of Example 1.

FIG. 2 graphically represents the relationship between the temperature and the melt viscosity of the several compositions in this example plotted from the melt viscosity measurements obtained in accordance with the hereinbefore described method (the numerals in the fiture denote the blend number). It can be seen that in the case of the invention compositions a marked improvement is had in the fluidity at low temperatures and that the dependence of the melt viscosity on the temperature is low.

Figure 3:
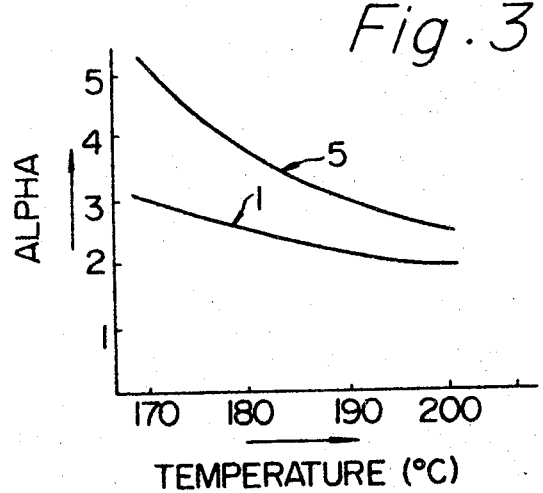
FIG. 3 is a graph illustrating the change in fluidity which takes place concomitantly with the change in the temperature of the composition of Example 1.

FIG. 3 graphically represents the relationship between the temperature and fluidity in the case of compositions 1 and 5, as obtained experimentally using the equation $Fe^\alpha = kj$, where $Fe$ is shear stress and $j$ is shear velocity (the numerals in the figure denote the blend number). It is clear from this figure that the invention compositions are closer to the Newtonian fluid than the conventional PVC compositions (if $\alpha = 1$, agreement is had with the Newtonian fluid). This fact indicates that the fluctuation in fluidity resulting from temperature changes, one of the causes of poor processability of the conventional PVC compositions, can be solved by the use of the invention compositions. This phenomenon brings on notable advantages to the present invention particularly in the case of a processing method where the flow is caused to take place under non-isothermal conditions as in injection molding. Again, this phenomenon also brings on advantages to the present invention in the case of the extrusion processing method, since fluctuations in the amount extruded and the properties of the extruded product are not brought about as a result of nonuniformity of the established temperature or the amount of feed.

Further, when the extrusion of pipes was carried out using the PVC compositions blend Nos. 1, 5 and 8 with the die temperature 190° C. and the other conditions constant, the amount extruded per unit time with that of blend 5 composition (PVC alone) as 100 percent was 120 – 130 percent in the case of blend 1 composition and 75 – 85 percent in the case of blend 8 composition. On the other hand, the surface condition was unsatisfactory in the case of blend 5 composition and excellent in the case of the blends 1 and 8 compositions. This fact shows that the manufacture of pipes which possess greater transparency can be carried out at higher speeds by the use of the compositions of the present invention.

EXAMPLE 2

When the amount incorporated of the copolymer sample A is increased from 5 parts by weight to 40 parts by weight in the blend containing copolymer sample A shown in Table 2, the softening temperatures and light transmittances shown in Table 3 are obtained. It can be seen from Table 3 that heat resistance is imparted as the amount incorporated of the copolymer sample A is increased with practically no impairment of the transparency of the product. The softening temperature was measured by JIS Method K674.

TABLE 3

| Amount of Copolymer Sample A Incorporated (part by wt) | Softening Temperature (°C) | Light Transmittance (%) |
|---|---|---|
| 0 | 70 | 91 |
| 5 | 71 | 90 |
| 10 | 74 | 91 |
| 20 | 77 | 89 |
| 30 | 79 | 87 |
| 40 | 82 | 85 |

EXAMPLE 3

The vacuum moldability at elevated temperatures of plasticized compositions of the following composition (the unit being part) was examined.

| Blend No. | 10 | 11 |
|---|---|---|
| PVC (degree of polymerization 2700) | 100 | 50 |
| DOP | 50 | 50 |
| Copolymer sample A | – | 50 |
| Cadmium stearate | 2 | 2 |
| Barium stearate | 1 | 1 |

Figure 4:
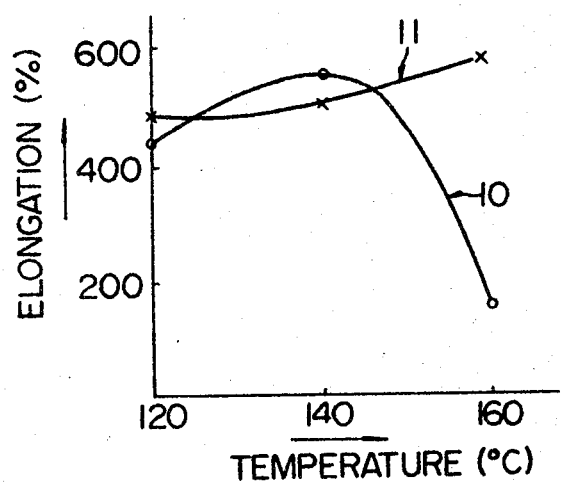
FIG. 4 is a graph depicting the relationship between the elongation and temperatures in the elevated temperature range in the case of the composition of Example 3.

The blends 10 and 11 compositions were kneaded on rolls and pressed at an elevated temperature, following which the elongation of the products were examined with the results shown in FIG. 4. Whereas the elongation at elevated temperature of the blend 10 not incorporated with the copolymer sample A became small, that of blend 11 incorporated with the copolymer sample A did not decline. This indicates that the latter is capable of being vacuum molded at elevated temperatures.

We claim:

1. A vinyl chloride polymer composition excelling in processability, transparency and other properties, said composition consisting essentially of (I) at least one vinyl chloride polymer selected from the group consisting of vinyl chloride homopolymers and vinyl chloride copolymers containing at least 70 percent by weight vinyl chloride, and (II) a copolymer consisting of 2 – 30 percent by weight of an unsaturated nitrile, 10 – 88.2 percent by weight of methyl methacrylate and up to 60 percent by weight of an alkyl acrylate, the weight ratio of alkyl acrylate to methyl methacrylate being from 1:9 to 2:1.

2. A composition according to claim 1 wherein said unsaturated nitrile is acrylonitrile.

3. A composition according to claim 1 wherein said alkyl acrylate is a $C_{2-8}$ alkyl acrylate.

4. A vinyl chloride polymer composition excelling in processability, transparency and other properties, said composition consisting essentially of (I) 100 parts by weight of at least one vinyl chloride polymer selected from the group consisting of vinyl chloride homopolymers and vinyl chloride copolymers containing at least 70 percent by weight vinyl chloride, and (II) 0.2 – 100 parts by weight of a copolymer consisting of 2 – 30 percent by weight of an unsaturated nitrile, 10 – 88.2 percent by weight of methyl methacrylate and up to 60 percent by weight of an alkyl acrylate, the weight ratio of alkyl acrylate to methyl methacrylate being from 1:9 to 2:1.

* * * * *